United States Patent [19]

Kinzler et al.

[11] 4,225,372
[45] Sep. 30, 1980

[54] SURFACE FINISHING

[75] Inventors: Jack A. Kinzler, Seabrook; James T. Heffernan, Friendswood; Leroy G. Fehrenkamp, Houston; William S. Lee, Friendswood, all of Tex.

[73] Assignee: The United States of America as represented by the National Aeronautics and Space Administration, Washington, D.C.

[21] Appl. No.: 6,952

[22] Filed: Jan. 25, 1979

Related U.S. Application Data

[60] Continuation of Ser. No. 785,279, Apr. 6, 1977, abandoned, which is a division of Ser. No. 568,541, Apr. 16, 1975, Pat. No. 4,032,089.

[51] Int. Cl.³ .............................................. B32B 31/18
[52] U.S. Cl. ................................... 156/154; 156/160; 156/163; 156/212; 156/267; 156/295; 156/323; 156/331
[58] Field of Search ................. 56/154, 160, 163, 267, 56/280, 295, 297, 323, 331, 212; 244/125, 126, 130

[56] References Cited

U.S. PATENT DOCUMENTS

| | | | |
|---|---|---|---|
| 1,269,420 | 6/1918 | Gibbons | 156/160 |
| 2,828,799 | 4/1958 | Harrison | 156/163 |
| 3,065,940 | 11/1962 | Eckstein | 244/130 |
| 3,271,222 | 9/1966 | Moorman | 156/212 |
| 3,453,166 | 7/1969 | Herriott et al. | 156/295 |
| 3,607,595 | 9/1971 | Windecker | 244/126 |
| 3,616,197 | 10/1971 | Amberg et al. | 156/212 |
| 3,841,942 | 10/1974 | Carlson et al. | 156/323 |

FOREIGN PATENT DOCUMENTS 558419  4/1942  United Kingdom ..................... 156/163

Primary Examiner—Jerome W. Massie
Attorney, Agent, or Firm—Edward K. Fein; John R. Manning; Marvin F. Matthews

[57] ABSTRACT

A surface of an article adapted for relative motion with a fluid environment is finished by coating the surface with a fluid adhesive, covering the adhesive with a sheet of flexible film material under tension, and setting the adhesive while maintaining tension on the film material whereby the tensioned film material is bonded to the surface by the adhesive.

18 Claims, 7 Drawing Figures

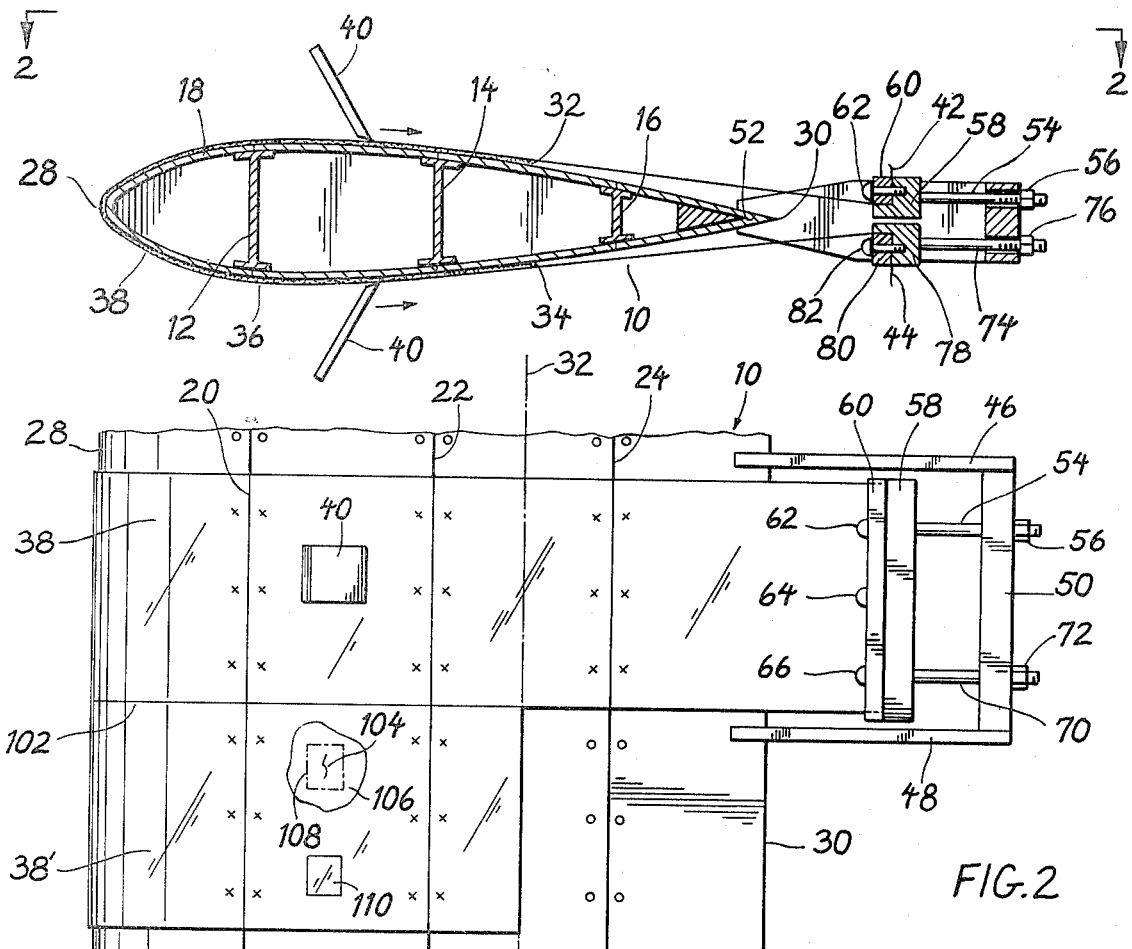
FIG. 1
FIG. 2
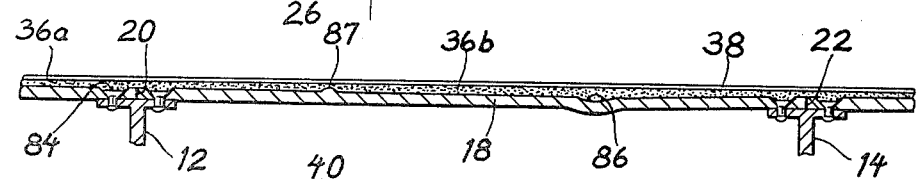
FIG. 3
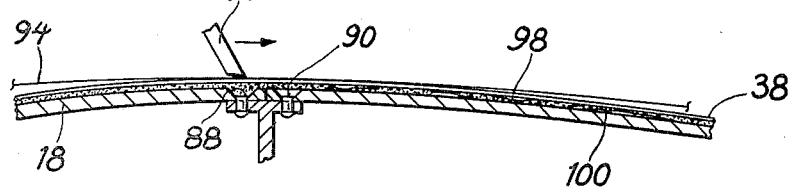
FIG. 4
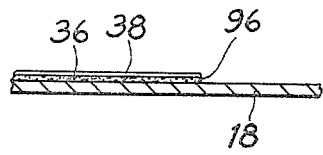
FIG. 5
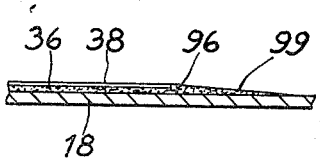
FIG. 6
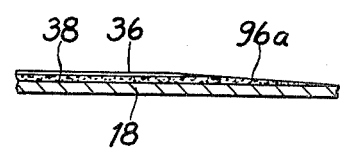
FIG. 7

SURFACE FINISHING

ORIGIN OF THE INVENTION

The invention described herein was made by employees of the United States Government and may be manufactured and used by or for the Government of the United States of America for governmental purposes without the payment of any royalties thereon or therefor.

This is a continuation of application Ser. No. 785,279, filed Apr. 6, 1977, now abandoned which in turn is a division of application Ser. No. 568,541, filed Apr. 16, 1975, now U.S. Pat. No.. 4,032,089, issued June 28, 1977.

BACKGROUND OF THE INVENTION

1. Field of the Invention

The present invention relates to the finishing of surfaces of articles intended for relative motion with respect to a fluid, i.e. gas or liquid, environment such as air or water, and particularly to the surfaces of airfoils. It is especially useful in finishing the wings of aircraft.

In finishing the surfaces of an aircraft wing, three of the major considerations are: smoothness of the finish, general correspondence of the surface to an optimum configuration, and resistance to abrasion.

The first of these is of extreme importance in connection with the wings of metal (usually aluminum) aircraft whose surfaces contain many irregularities caused by rivets, seams, etc. Even one such surface irregularity can drastically reduce the efficiency of the wing if it is located between the leading edge and the boundary layer separation point of the wing. As is well known in the art, aircraft wings, particularly those designed for low speed aircraft, are configured so as to cause the air through which they move to flow along the airfoil surface from the leading edge to a point known as the boundary layer separation point. From this point to the trailing edge of the airfoil, the air no longer follows the contour of the airfoil but becomes turbulent. Surface irregularities between the leading edge and the boundary layer separation point, especially those which are disposed transverse to the direction of air flow, interrupt the flow of air along the airfoil surface creating turbulence and increasing drag on the wing. One ramification is that the aircraft must then use an excessive amount of fuel. The turbulence created by surface irregularities can also generate flutter phenomena, and vibration and resonance problems. Furthermore, it will be appreciated that an irregular, as opposed to a smooth, surface experiences more frictional heat as it moves through a fluid. It is thus of extreme importance that the finish of an aircraft wing, especially at an near the leading edge, be as smooth as possible.

The second consideration, correspondence to an optimum configuration, is somewhat similar in that it too relates to the efficiency of the wing. In designing a wing for a particular aircraft, an optimum configuration, represented by a mathematical model or curve, is determined. This optimum configuration is designed to provide maximum efficiency and, specifically, to maximize the lift-over-drag coefficient (L/D). In constructing the wing, it is important to see that the outer surface conforms to the optimum configuration as nearly as possible. Again, this is most important at and near the leading edge of the wing where even the slightest deviation from the optimum configuration can reduce wing efficiency. Unfortunately, it is virtually impossible to construct a wing which corresponds perfectly with the mathematical curve, especially when working with metal. A metal wing is usually provided with a number of internal support beams and an outer skin of sheet metal. The metal skin tends to dip in the areas between beams and form shallow concave deviations from the optimum configuration.

The third consideration, resistance to abrasion, is also most critical at and near the leading edge of the aircraft wing which tends to become worn by dust and other suspended particles in the air through which it moves. Abrasion of the surface results in irregularities, the problems of which are discussed above.

As mentioned above, surface finish and correspondence to the optimum configuration are of particular importance in the wings of low speed aircraft in which the air must flow along a substantial portion of the surface to provide lift for the aircraft. In high speed aircraft, i.e. those which typically cruise at speeds in excess of about 250 to 275 m./sec. (meters per second), the airfoil shape of the wing is not critical during high speed operation so that these first two problems are not as severe. However, the problems do still exist to a certain extent and, of course, the problem of abrasion at the leading edge is present. Indeed, it will be appreciated that smooth, abrasion resistant surfaces which correspond as nearly as possible to their optimum configurations are advantageous, to varying degrees and for various reasons, in virtually any article which moves relative to a fluid medium. For example, the hulls of boats would benefit from such surfaces.

2. Description of the Prior Art

In the past various methods of combating the above-mentioned problems have been devised. To provide a smooth surface conforming closely to an optimum configuration, the wings of low speed aircraft such as racing gliders have sometimes been constructed of materials such as fiberglass which are molded and hand finished by sanding, polishing, etc. This provides a relatively smooth and true surface. However, the hand finishing is tedious, time consuming and expensive and requires special skill. Additionally, there is a great weight penalty in using relatively heavy wings of solid fiberglass.

Aluminum wings are often used because of their relatively light weight. However, as mentioned above, they necessarily contain surface irregularities such as seams and rivets as well as concave deviations from the optimum configuration. These irregularities and concavities have sometimes been eliminated by skilled workers spreading a filler material over the irregularities and/or concavities, allowing it to harden, and then sanding it, preferably with an instrument having a straight edge. As in the hand finishing of fiberglass wings, this is time consuming and expensive.

U.S. Pat. No. 3,607,595 discloses another method for alleviating surfaces irregularities in metal wings by covering them with a hardenable foam sealed with a thermosetting resin. It is believed that relatively highly skilled workers and/or expensive and sophisticated equipment would be needed to practice this method. In any event, it is apparent that the method would affect only relatively small surface irregularities and would be of little use in correcting larger deviations from the optimum configuration.

U.S. Pat. No. 2,973,170 teaches the coating of an aircraft wing with porcelain. Again, it is noted that this would appear to require a relatively high degree of sophistication in the workers and/or the equipment used and might only serve to correct minor surface irregularities. Additionally, it is noted that porcelain is a relatively heavy material and thus undesirable for use in aircraft.

None of the above methods, except possibly the last mentioned, are useful in providing resistance to abrasion, and other techniques have been used for this purpose. Generally, these have consisted of hardsurfacing the leading edges of the wings. A common hardsurfacing material is an epoxy heavily impregnated with tungsten carbide powder. The material is quite hard and resistant to abrasion. However, it is also very brittle so that when it does wear, it tends to break away in chunks rather than wearing gradually. This leaves distinct cavities in the surface which render the wing highly inefficient and even dangerous. Furthermore, the hardsurfacing techniques, like the finishing methods described above, require sophisticated workers and/or equipment and are thus expensive.

SUMMARY OF THE INVENTION

The present invention provides a method of finishing a surface such as that of an aircraft wing and which is instrumental in achieving all three of the major considerations discussed above, i.e. smoothing of surface irregularities, general correspondence to the optimum configuration, and resistance to abrasion. It also provides a number of additional advantages such as attractive appearance and easy maintenance. The method is relatively simple to practice so that elaborate equipment is not necessary and the practice of the method need not be limited to major facilities specially equipped for it. Similarly, the degree of special skill needed to practice the method is not as high as that required for prior finishing methods. Thus, the method of the invention is considerably less expensive than others.

In the method of the present invention the surface to be finished is coated with a fluid adhesive. The adhesive is then covered with a sheet of flexible film material under tension. This may include application of pressure to the film for example by stroking from a central area of the sheet toward the edge with a smooth bladed instrument while maintaining tension on the film. The tension of the film and applied pressure causes the adhesive material to conform to surface irregularities, e.g. to fill rivet depressions, and also to conform to or fill concave deviations from the optimum configuration of the surface. At the same time, the tension on the film material prevents it from conforming to these irregularities and deviations. The adhesive is then set, as by simply allowing it to stand, while tension on the film material is maintained, so that the film is bonded to the surface by the adhesive.

It will readily be appreciated that this method simultaneously smooths surface irregularities and at least partially corrects concave deviations from the optimum configuration. The film material used is also preferably highly resistant to abrasion. The film and the adhesive layer are both quite lightweight and thin so that they do not add undue bulk or weight to the article being treated. The film can also be chosen to have many other desirable features such as resistance to high and low temperatures, resistance to ultra-violet radiation, attractive appearance, etc.

The tensioned film also adds structural strength to the article. If appropriately colored, the film can eliminate the need for painting of the article and, since it is quite durable, requires less maintenance than surfaces which must be periodically repainted. If the film does become damaged, it can easily be patched. The edges of the patch form only the most minor breaks in the smooth surface and can be smoothed to virtually eliminate even these breaks.

It is thus a principle object of the invention to provide a method of finishing a surface by covering it with a sheet of flexible film material under tension.

Another object of the invention is to provide a method of correcting surface irregularities in an article to be finished.

Still another object of the invention is to provide a method of correcting concave deviations from an optimum configuration of a surface.

A further object of the invention is to provide a method of finishing a surface of an article which adds structural strength to the article without a significant increase in weight or bulk.

Still another object of the invention is to provide a rigid article for motion with respect to a fluid environment and having a tensioned sheet of film material bonded to its surface.

These and other objects, features, and advantages of the invention will be made apparent by the following detailed description of the preferred embodiments, the drawing and the claims.

BRIEF DESCRIPTION OF THE DRAWING

FIG. 1 is a transverse sectional view of an aircraft wing, a surface of which is being finished by the method of the present invention.

FIG. 2 is a plan view of the apparatus of FIG. 1 on lines 2—2 of FIG. 1.

FIG. 3 is an enlarged transverse sectional view of a small portion of an aircraft wing which has been finished according to the invention.

FIG. 4 is an enlarged transverse sectional view of a small portion of an aircraft wing, the surface of which is being finished by a modified form of the method of the present invention.

FIG. 5 is a detailed sectional view showing a blunt edge of film material on an article finished in accord with the present invention.

FIG. 6 is a detailed sectional view showing one method of smoothing the blunt edge of FIG. 5.

FIG. 7 is a detailed sectional view showing another method of smoothing the blunt edge of FIG. 5.

DESCRIPTION OF THE PREFERRED EMBODIMENTS

Referring now to FIGS. 1 and 2 there is shown a portion of the wing 10 of an aircraft, specifically a glider. The wing includes three parallel I-beams 12, 14, and 16 which run along the length of the wing. An aluminum skin 18 covers the beams 14–16 and gives the wing its basic configuration. The skin 18 is not one continuous piece of aluminum but is formed of segments. The seams, e.g. 20, 22, and 24, where these segments meet form irregularities in the outer surface of the aluminum skin 18. Other irregularities may include the depressions formed by recessed rivets such as 26. The locations of a number of these rivets is indicated by small x's in FIG. 2.

As explained above, smoothness of surface finish, correspondence to optimum configuration, and resistance to abrasion are most critical at and near the leading edge of an aircraft wing, particularly that of a low speed craft such as a glider. Fortunately, this forwardmost portion of a wing is particularly well adapted to finishing by the method of the present invention since its optimum configuration contains no concavities. Thus, FIGS. 1 and 2 illustrate a typical application of the invention to finishing the forwardmost portion of the outer surface of the glider wing 10, i.e. a portion adjacent the leading edge 28 and extending rearwardly toward the trailing edge 30 to a line 32 on the upper side and a line 34 on the lower side. However, as will be explained more fully below, the invention could also be used to finish the entire surface of an aircraft wing as well as the surfaces of many other articles intended for motion through a fluid environment.

In finishing the surface it is first cleaned. For an aluminum surface, the cleaning would probably include treatment with a chemical conversion coating which dissipates any aluminum oxide which might be present. The surface is then coated with a thin layer 36 of a fluid adhesive. The coating of adhesive can be applied to the entire area to be finished, or it may stop forward of the lines 32 and 34 since it will be caused to flow rearwardly during subsequent steps of the application. After the surface has been coated with the adhesive 36, the adhesive is covered with a sheet of transparent flexible film material 38 under tension. In particular, the sheet of film 38 is positioned on the adhesive coated surface with its central portion over the leading edge 28. From its central portion, the sheet of film material 38 extends along the upper and lower sides of the wing 10 toward the trailing edge 30. Tension is applied to the film material 38 in a direction perpendicular to the leading edge 28 by any suitable means. (One particularly simple means of applying the tension will be described more fully below by way of example.)

During the covering operation, the adhesive is caused to conform to any minor surface irregularities as well as to any concave deviations from the optimum configuration of the surface. In some instances the tension on the film material 38 may be sufficient to cause this conformance. However, in most cases it is preferable to apply pressure to the film material. This can be done by stroking the outer surface of the film material transversely with smooth bladed instruments such as hard plastic squeegees 40 moving generally from the leading edge 28 to the trailing edge 30 as indicated by the arrows in FIG. 1. The film material can first be lubricated, as by an oil spray, if desired. During this working or stroking tension is maintained on the film material. The stroking not only causes the adhesive to conform to the irregularities and concavities but also helps to achieve an adhesive layer which is sufficiently thin and free of bubbles as well as to smooth any wrinkles which may be present in the film material. While this working with the squeegees 40 causes the adhesive 36 to conform to the irregularities and concavities, the tension on film material 38 prevents it from also conforming to these irregularities and concavities. Thus, the outer surface of the finished articles, formed by the film, is smoother and truer than the outer surface of the original aluminum skin 18. Whether pressure is applied or not, the tensioned sheet of film material acts as a sort of two dimensional straight edge which conforms to the general configuration of the surface being treated so that the boundary surface of the adhesive layer adjacent the surface being treated can match the configuration of the latter while the boundary surface of the adhesive layer adjacent the film matches its relatively smooth and true configuration.

It will be appreciated that the present invention cannot correct convex deviations from the optimum general configuration and similarly that the invention is not readily applicable to surfaces whose optimum configurations include concavities. In regard to small surface irregularities, those which take the form of depressions in the surface and those projections which are smaller than the thickness of the adhesive layer can be totally corrected by the invention. If a projection exceeds the thickness of the adhesive layer, the film material will at least partially conform to it so that it cannot be totally corrected. However, the application of the invention to such a projection would at least make it less sharp or abrupt.

The adhesive is then set while tension on film material 38 is maintained. The preferred adhesives can be set merely by allowing them to stand undistrubed at ambient temperature and pressure. However, it will be appreciated that many different adhesives might be used and that some may require heating or other additional treatment for setting. The adhesive is considered "set" when it is able to maintain the position and tension of the film material when the tension application means is released. At this point, the means of applying tensions to the film material may be released and the wing allowed to stand for an additional length of time to provide further setting and a better bond of the film material to the aluminum via the adhesive.

As mentioned above, tension can be applied to the sheet of film material 38 by any suitable means. One such means is illustrated in FIGS. 1 and 2. It will be observed that the sheet of film material 38 is larger than the area being covered so that there are free or unbonded portions adjacent its edges 42 and 44 and disposed rearwardly of the lines 32 and 34. Tension is applied to the film material 38 by pulling its edges in a rearward direction with respect to wing 10 perpendicular to the leading edge.

The tension application means comprises side frame members 46 and 48 rigidly joined at their ends by a rear frame member 50 to form a three sided frame. The forward end of each side frame member 46, 48 has a wedge-shaped slot, e.g. 52 of member 46, sized and shaped to receive the trailing edge 30 of the wing 10. Upper and lower clamp assemblies are mounted on the frame. The upper clamp assembly comprises a clamp base 58 and a clamp element 60 mounted on rear frame member 50 by means of a pair of adjusting pins 54 and 70 rigidly secured to the clamp base 58 in any suitable manner. The free portion of film material 38 depending from the upper side of the wing 10 adjacent adge 42 is clamped between clamp element 60 and clamp base 58 by clamp bolts 62–64 which pass through suitable apertures which are formed in clamp element 60, clamp base 58, and film material 38. The rear portions of adjusting pins 54 and 70 are threaded and respective nuts 56 and 72 are threaded onto the adjusting pins rearwardly of the rear frame member 50. By adjusting the nuts 56 and 72, the adjusting pins 54 and 70, the clamp base 58 and the clamp element 60 can be moved toward rear frame member 50 to apply tension to the film material on the upper side of the wing 10. It will be appreciated that the engagement of the trailing edge 30 of the wing by the notches, e.g. 52, in the side frame members 46 and 48 braces and immobilizes the frame with respect to the wing.

The lower clamp assembly is a mirror image of the upper clamp assembly and operates in exactly the same way. It comprises a clamp base 78, a clamp element 80, clamp bolts—one of which is shown at 82, and adjusting pins—one of which is shown at 74 with its respective nut 76.

It should be noted at this point that the particular means of applying tension to the film material is not critical to the present invention. The above example merely illustrates one type of apparatus which can be used. The simplicity of the apparatus of the example does illustrate the fact that the method of the invention can be practiced with extremely simple and inexpensive apparatus. The tension application device of the example could be made in even the most modestly equipped shop. Thus, the method could be practiced even by individual owners of private aircraft without elaborate equipment. Of course, commercial applications of the method would probably employ more sophisticated automated equipment, but in any event it will be appreciated that many other devices, both simple and elaborate, for applying tension could be devised and used.

The particular film and adhesive materials used in the present invention can be varied. With regard to the film, it is first noted that the term "film" as used herein refers to sheet material whose thickness is $7.62 \times 10^{-2}$ cm. (0.030 in.) or less and that the preferred range of thicknesses for the film material is between $5.08 \times 10^{-3}$ cm. (0.002 in.) and $7.62 \times 10^{-2}$ cm. (0.030 in.). Within this range the thickness can be varied depending on the characteristics to be emphasized in a particular application. For example, a thicker film enhances the "straight-edge" effect described above, while a thinner film is obviously lighter in weight. For general usage, a film thickness of about $1.27 \times 10^{-2}$ cm. (0.005 in.) has been found quite excellent. In any event, even films near the upper limit of the range, if formed of suitably chosen materials, should present no substantial weight penalty for many applications. Similarly, such films would, in most cases, not present a bulk problem, i.e. they would not alter the size of the wing so as to greatly reduce its efficiency, particularly in view of the increased wing efficiency resulting from use of the present method.

One type of film material which has been found particularly useful in the practice of the invention is a polyimide film known commercially as 500 H Film and available from E. I. Du Pont de Nemours & Co., Wilmington, De. This film is light-weight, transparent and flexible, yet it is substantially inelastic and has high tensile strength. Additionally, it is resistant to abrasion, impact, heat, cold and ultra-violet radiation. It has an extremely smooth glossy surface which is ideal for aerodynamic efficiency and also presents an attractive appearance. Another film material which has been found well adapted for use in the present invention is a polyester film known commercially as "Mylar" and also available from E. I. Du Pont de Nemours & Co., Wilmington, De. The physical properties of Mylar are generally similar to those described above with respect to 500 H Film except that it is not as resistant to ultraviolet radiation.

These two film materials have been given as examples of films which have been used and tested in the method of the invention and which are presently preferred. They can also be used as standards against which terms such as "flexible," "inelastic", "lightweight," etc. used herein can be construed. There are, however, many other materials, generally polymeric in nature which can be used to make the film material used in the present invention. Non-limiting examples of other polymeric substances which might be used to form usable films are: nylons, polyvinylidine choloride, polyvinylacetate, polyvinylchloride, polyethylene, polypropylene, etc. Virtually any material capable of forming a film can be used as long as it has certain basic characteristics pertinent to the present invention.

The film must be flexible enough to allow its application to a non-planar surface and capable of being bonded to the material being treated. The surface of the film of course, should be as smooth as possible but definitely have less surface irregularities and discontinuities than the surface which it is to cover. The film is preferably substantially inelastic but, if elastic, it must be sufficiently resilient to allow it to be pulled taut over the surface being treated without conforming to the irregularities and concavities in that surface. Other desirable characteristics such as heat resistance, high tensile strength, attractive appearance, etc. may be present in the film material to varying degrees depending upon the needs in a particular application.

The adhesive used to bond the film material to the surface being treated actually serves as both an adhesive and a filler and should be capable of performing both of these functions for the particular surface and film material involved. The nature of the adhesive is primarily dictated by the film material chosen. It must be capable of bonding this film material to the surface being treated. The adhesive might comprise a single constituent, or it may be made up of several substances, for example one which serves primarily as an adhesive and another which serves primarily as a filler. For example, a filler such as finely divided silica might be added to the adhesive. It must be initially sufficiently fluid that it can be made to conform to the irregularities and concavities in the surface and must be capable of being subsequently set. It preferably does not become completely rigid when set, but rather retains some resiliency. It is preferably of a type which is set or cured by being allowed to stand undisturbed at ambient temperature and pressure, but can be a substance which must be heated or otherwise treated to cause hardening. One adhesive which has been used successfully in bonding films of the preferred materials, polyimides and polyesters, to aluminum surfaces is an elastomeric polyurethane resin marketed as Urethane #RP 6401 by Ren Plastics.

Articles whose surfaces have been treated with the preferred films and adhesives according to the present invention have been tested for adverse effects due to thermal shock. They have been able to withstand temperature variations of 350° F. to $-150°$ F. without separation of the bonded film or other adverse effects. The abrasion resistance of these articles has also been tested by sandblasting. The preferred film materials were found to be highly resistant to abrasion to a point that it is believed that they will be at least as effective as, if not better than, the epoxy-tungsten carbide hardsurfacing materials now being used. Furthermore, the wear pattern of the films is gradual; they do not break away in pieces.

Turning once again to the drawings, FIG. 3 shows the manner in which the adhesive 36 conforms to the irregularities in the surface of the aluminum skin 18 and also to the concave deviations from the optimum configuration of the surface. Note that the lower boundary surface of the adhesive layer matches the upper surface of the aluminum skin 18 to conform to irregularities such as the rivet recess 84, seams 20 and 22, a small projection 87, and a small dent 86. The aluminum skin 18 forms a very shallow dip or concavity in the area between the beams 12 and 14. This represents a deviation from the optimum configuration of the wing in this area. As evidenced by the greater thickness of the adhesive layer at 36b as opposed for example to 36a, the adhesive serves to fill the concavity between the beams 12 and 14. The film material 38 does not conform either to the irregularities or to the concavity between the beams 12 and 14. Thus, the surface which is present is smoother, i.e. freer of minor irregularities, and truer, i.e. closer to the optimum general configuration, than the surface of the original aluminum skin. It should also be noted that the preferred films are smoother or more highly polished on a microscopic scale than the aluminum skin. The upper boundary surface of the adhesive layer matches the configuration of the film so that the adhesive layer serves as a filler between the relatively irregular and deviated configuration of the aluminum skin and the relatively smooth and true configuration of the film material. At this point is should be noted that the relative thicknesses of the adhesive layer and film material with respect to the aluminum skin in the Figures have been exaggerated for purposes of illustration. Additionally, the adhesive layer has been shown as thicker than the film material in order to illustrate various details. However, it should be understood that the adhesive layer would ordinarily be thinner than the film layer. As mentioned above, the film material is less than $7.62 \times 10^{-2}$ cm. thick, and the adhesive layer, except perhaps at areas of concavities or indentations, is usually even thinner. Thus, no appreciable bulk or weight is added to the treated wing.

FIG. 4 illustrates a modification of the method in which a sheet of protective material 94 is interposed loosely between the film material 38 and the sequeegee 40 during working with the latter. The sheet of protective material 94 may be held in place by any suitable means. Although the squeegee 40 will not usually significantly scratch or mar the film material 38, the protective sheet 94 can be used to further ensure a perfect finish.

FIG. 4 also illustrates the effect of working with the squeegee 40. For example, the area to the left of the squeegee 40 has been worked and it can be seen that the adhesive layer in this area conforms to both the surface of the aluminum skin 18, e.g. filling rivet depression 88, and to the smooth underside of the film material 38. In the area to the right of the squeegee the adhesive has not been forced into rivet depression 90 and there are bubbles, e.g. at 98 and 100, adjacent both the film material 38 and the skin 18.

In finishing the leading edge and adjacent areas of an aircraft wing in large scale commerical operations, it may be possible to use a single piece of the film material. However, in some instances, such as in small scale operations, or where the shape of the wing so dictates, it may be more practical to cover the area with a number of segments of the film material. FIG. 2 illustrates one segment of film material 38 being installed and another segment of film material 38' already in place. Each segment of the film material extends to the line 32 on the upper side of the wing and to the line 34 on the lower side of the wing. These lines are located somewhat rearwardly of the boundary layer separation points for the wing so that the most crucial part of the wing is covered. The seam 102 between the two segments represents only a very small irregularity in the airfoil surface because the film material is so thin. However, this seam can be further smoothed by sanding or by applying an appropriate filler to the seam and then sanding. In any event, the seam 102 runs parallel to the direction of air flow during use of the wing so it offers minimum resistance to proper flow. The seams 20 and 22 and the concave configuration deviations between the beams, on the other hand, run transverse to the air flow, the worst possible condition, and these are corrected by the adhesive and film finish.

When a segment of film material has been applied to the wing 10 and the adhesive is sufficiently set, the free portions of that segment are trimmed away along the lines 32 and 34 leaving blunt edges such as that shown at 96 in FIG. 5. If these edges are located far enough from the leading edge of the wing, they will not present any major loss of wing efficiency even though they run transverse to the direction of movement of the wing. However, they can be smoothly finished by several techniques, two of which are illustrated in FIGS. 6 and 7. In FIG. 6 a filler, which may be identical to the adhesive 36, is spread on the wing adjacent the blunt edge 96 of the film material 38, hardened, and then sanded to form a smooth tapered edge as at 99. In FIG. 7 both the film material 38 and the adhesive 36 have been sanded to form a smooth tapered edge as at 96a.

Another important feature of the invention is that, if the film material on a finished article should become torn or damaged, the entire segment of film material need not be replaced but can be satisfactorily patched. In FIG. 2 a tear in the original film material is shown at 104. To repair this tear, a small piece of film material 106 is placed over the tear 104. A cut is then made as on dotted line 108. This allows a small square of the old film material containing the tear 104 to be removed and simultaneously provides a patch of the new film material which is the same shape and size as the piece removed. Adhesive can then be applied to the area from which the film material was removed and the new patch placed on the adhesive to provide a patch such as that shown at 110. After the adhesive has hardened, the seams of the patch can be smoothed in the same manner as seam 102 described above.

The invention can be modified for certain special uses. For example, it might be modified for use as a means for repairing a relatively deep dent in an aircraft wing, as opposed to the shallow surface irregularities and concave deviations discussed above. The dent could first be filled with a fluid filler, perhaps identical with the fluid adhesive used to bond the film material to the surface. This preliminary deep filling would then be cured and then the adhesive and film material applied as described above. The invention could also be used to provide deicing apparatus for the leading edge of an aircraft wing. A first coating of the adhesive would be applied. Fine heating wires, perhaps in the form of an extremely thin printed circuit, would then be emplaced on the first coat of adhesive. After suitable curing of the first coat, a second coat of adhesive would be applied over the heating wires. Finally, the film material would be applied as usual.

It will be readily appreciated that the finishing method of the invention, particularly when applied to aircraft wings, corrects minor irregularities in the surface finished. It also at least partially corrects concave deviations from the optimum configuration of the surface. It also provides for high resistance to abrasion. It is believed that the application of the invention to the leading edge and adjacent portions of low speed aircraft wings will result in a 10% to 15% increase in wing accuracy, i.e. freedom from minor irregularities and general correspondence to optimum configuration. This in turn will result in an increase in wing efficiency on the order of 5%. The ramificiations of this improvement are more striking when it is realized that, in the past, a 2% or 3% increase in wing accuracy has been considered a major improvement.

In addition to these three major benefits, the invention also provides a number of other advantages. Depending on the characteristics of the film material chosen, it may add structural strength to the article by virtue of its tensile strength. It may be used in controlling flutter phenomena and vibration problems by damping or by changing the natural resonance frequency of the article. It can do away with the need for painting the finished surfaces, and its subsequent maintenance is negligible compared to that of painted surfaces. The finish of the invention also seals the treated surface so that, if the surface is metal for example, it is protected against corrosion. It also provides an extremely smooth polished finish which offers minimal frictional resistance to the fluid which flows relative to the surface thus reducing heat build up.

The invention is adaptable to large scale commercial operations as well as to very modest operations. It can be practiced quite easily by one with little special skill. It can be used as the final finishing step in producing new articles, or it can be used to improve old articles.

Certain modifications of the preferred embodiments described above will suggest themselves to those skilled in the art. For example, the two steps of applying the adhesive and the film material to the surface could be performed simultaneously by first spreading the adhesive on the underside of the film material and then applying the composite to the surface. Similarly, while the invention has been described in terms of finishing the leading edge and adjacent portions of the wing of a low speed aircraft, the entire wing could be covered, or many other parts of a variety of types of aircraft could be finished. Other articles intended for relative motion with a fluid environment, e.g. hulls of boats, could also be finished. In this latter connection the extremely smooth surface provided by a suitable film material would probably be instrumental in preventing the attachment of barnacles to boat hulls. Accordingly, it is intended that the scope of the invention be limited only by the claims which follow.

We claim:

1. A method of smoothing the surface of an article adapted for relative motion with a fluid environment, said surface containing surface irregularities therein, comprising the steps of:
    (a) coating said surface with a fluid adhesive/filler material;
    (b) covering said adhesive/filler material with a preformed flexible, substantially inelastic film of a controlled uniform thickness;
    (c) applying tension to said film by pulling its edges with a force less than that which would result in any effective stretching of the film in a direction along the surface such as to allow said film to be pulled over said surface without conforming to said surface irregularities, said pulling serving to enhance the stiffness of said film and causing it to serve as a smooth outer straightedge optimally conforming to the desired contour of the surface and further to act as an automatic gauge to simultaneously redistribute and control the flow and positioning, and thus minimize the quantity of adhesive/filler material so as to result in an inner layer of varying thickness from an amount just sufficient to act as an adhesive to an amount just sufficient to fill in said surface irregularities; and
    (d) setting said adhesive/filler material while maintaining tension on said film whereby said tensioned film is bonded to said surface by said adhesive/filler material, providing a smooth uninterrupted finish thereto.

2. The method of claim 1 wherein prior to the step of setting said adhesive/filler material, said method further includes the step of applying pressure to said film progressively from a central area of said film toward an edge thereof in a squeegee action 3. The method of claim 2 wherein said pressure is applied by stroking a smooth bladed instrument transversely across said film.

4. The method of claim 3 further including the step of applying a lubricant to said film prior to said stroking.

5. The method of claim 5 wherein a sheet of protective material is interposed between said film and said instrument during said stroking.

6. The method of claim 1 including a further step of releasing the tension on said film material after said setting of said adhesive 1 filler material and then further setting said adhesive/filler material.

7. The method of claim 1 further including the step of cleaning said surface prior to coating with said adhesive/filler material.

8. The method of claim 1 wherein said surface includes an unfinished portion and said film material includes an unbonded portion adjacent said unfinished portion of said surface and further including the step of trimming away said unbonded portion of said film material and smoothing the trimmed edge of said film material to provide a smooth interface between said film material and said unfinished portion of said surface.

9. The method of claim 8 wherein said trimmed edge is smoothed by applying a fluid filler to said edge and smoothing said filler.

10. The method of claim 8 wherein said trimmed edge is smoothed by sanding.

11. The method of claim 1 wherein said surface comprises the leading edge of an airfoil.

12. The method of claim 11 wherein the tension on said film material is applied in a direction generally perpendicular to said leading edge.

13. The method of claim 12 wherein said surface further comprises upper and lower portions of said airfoil immediately adjacent said leading edge.

14. The method of claim 13 wherein said adhesive/filler material is covered with a plurality of said sheets of film material disposed contiguous one another along the length of said airfoil and each having a central portion disposed adjacent said leading edge and two end edges disposed on said upper and lower surfaces respectively.

15. The method of claim 1 wherein said film material is polymeric.

16. The method of claim 1 wherein said adhesive/filler material is capable of setting when allowed to stand undisturbed at ambient temperature and pressure.

17. The method of claim 1 wherein said adhesive/filler material comprises a resin filler.

18. The method of claim 20 wherein said resin filler comprises a polyurethane resin.

* * * * *